Sept. 25, 1928.  
G. L. HAMMOND ET AL  
RUBBER RING CUTTING MACHINE  
Filed March 30, 1927   6 Sheets-Sheet 3  
1,685,127

INVENTORS
Guy L. Hammond,
William Nicholas and
Lester H. Messinger, Jr.
BY
Chamberlain + Newman
ATTORNEYS.

Sept. 25, 1928.  
G. L. HAMMOND ET AL  
1,685,127  
RUBBER RING CUTTING MACHINE  
Filed March 30, 1927 6 Sheets-Sheet 4

Inventors  
Guy L. Hammond,  
William Nicholas and  
Lester H. Messinger, Jr.

By Chamberlain & Newman  
Attorneys

Sept. 25, 1928.

G. L. HAMMOND ET AL

1,685,127

RUBBER RING CUTTING MACHINE

Filed March 30, 1927

Inventors
Guy L. Hammond,
William Nicholas and
Lester H. Messinger, Jr.

By Chamberlain & Newman
Attorneys

Sept. 25, 1928.

G. L. HAMMOND ET AL

1,685,127

RUBBER RING CUTTING MACHINE

Filed March 30, 1927    6 Sheets-Sheet 6

INVENTORS
Guy L. Hammond,
William Nicholas, and
Lester H. Messinger, Jr.
BY Chamberlain & Newman
ATTORNEYS.

Patented Sept. 25, 1928.

1,685,127

UNITED STATES PATENT OFFICE.

GUY L. HAMMOND, LESTER H. MESSINGER, JR., AND WILLIAM NICHOLAS, OF BRIDGEPORT, CONNECTICUT, ASSIGNORS TO THE BLACK ROCK MANUFACTURING COMPANY, OF BRIDGEPORT, CONNECTICUT, A CORPORATION OF CONNECTICUT.

RUBBER-RING-CUTTING MACHINE.

Application filed March 30, 1927. Serial No. 179,502.

The present invention relates to improvements in ring-cutting machines particularly adapted for cutting rings from cylindrical stock—as rubber, rolled tire tape, etc.,—an object being to provide a machine of this character by which a uniform product may be maintained and in which the preparation and mounting of the stock in the machine will be greatly simplified. In particular, it is proposed to provide a machine in which the cylindrical stock is slidably mounted upon a supporting shaft and is adapted to be intermittently moved into relation with a cutting knife, the portion of the stock being cut being unsupported with respect to the surface of the shaft so that the cutting knife may completely penetrate the inner periphery of the stock without engaging the shaft.

A further object is to provide a machine in which the several parts are relatively adjustable for cutting different diameters and thicknesses of rings, and in which the speed relation between the knife and the material is adjustable for adaptation to materials of different cutting characteristics.

Another object is to provide improved means for automatically controlling the stopping and starting of the machine and the automatic return of the chuck-carrier to starting position upon completion of the cutting operation.

With the above and other objects in view, embodiments of the invention are shown in the accompanying drawings, and these embodiments will be hereinafter more fully described with reference thereto and the invention will be finally pointed out in the claims.

In the drawings.

Similar reference characters indicate corresponding parts throughout the several figures of the drawings.

Referring to the drawings, the machine is mounted upon a suitable legged support 20 and comprises a head stock 21 at one end and a tail stock base 22 at the other, the head stock including a pair of spaced supports 23 and 24 carrying bearings 25 and 26 in which the work-supporting shaft 27 is journaled. Upon this shaft, between the supports 23 and 24, there is loosely mounted a stepped pulley 28 driven by a belt 29 and adapted to be connected to the shaft by means of a sliding cone-clutch 30 controlled by starting and stopping mechanism hereinafter more fully described.

The outer end of the shaft is engaged by the reduced cone-center 31 of a reciprocating shaft 32 slidably mounted in bearings 33 and 34 provided in the upper portion of a frame support 35 mounted for swinging movement upon the tail stock base by means of the shaft end 36 of the chuck feeding screw shaft, hereinafter more fully referred to, and a stub shaft 37, respectively journaled in bearing supports 38 and 39 formed upon the base. The frame member is normally locked in upright position with the shaft 32 aligned with the shaft 27 by means of locking bolts 40 and 41 slidably mounted in supports 42 and 43 in the base and engaged over foot portions 44 and 45 provided on the frame member and normally resting on the base, said bolts adapted to be projected and retracted by means of a pivotally mounted hand lever 46 connected by links 47 and 48 with the respective bolts. Upon retraction of the bolts, the frame member may be swung to one side, as indicated in dotted lines, Figure 9, where it rests on a standard 49, and in which position the tubular stock to be cut may be slid upon the shaft 27.

Figure 3:
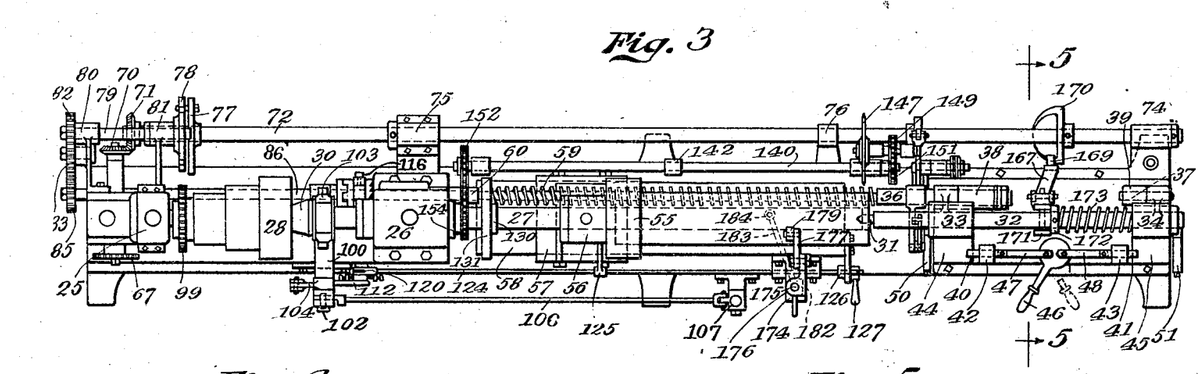
Figure 3 is a top plan view.
Figure 9:
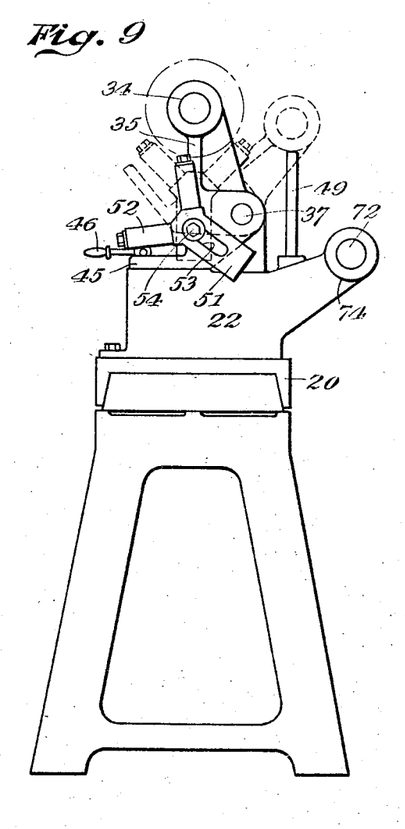
Figure 9 is an end elevation of the machine from the tail stock end.

In order to facilitate mounting of the stock upon the shaft 27, there are provided at each end of the frame member 35 Y-shaped supports 50 and 51 having rollers 52 upon the forked portions and normally disposed in inclined relation, as shown in full lines, Figs. 3 and 9. When the frame member is swung to one side (as shown in dotted lines), the Y-supports are uprightly disposed and the cylindrical tubular stock may be slid thereon on to the shaft 27. In order to adjust the Y-supports for different diameters of stock, the same are slotted, as at 53, and are secured to the frame ends by bolts 54 engaged in said slots.

Figure 8:
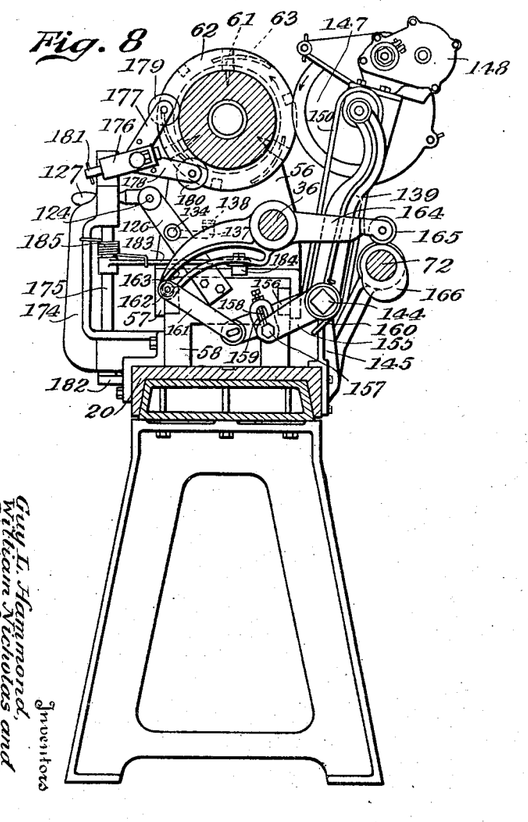
Figure 8 is a detailed sectional view taken along the line 8—8 of Figure 1 and showing the cutting knife operating mechanism.

The stock is secured at one end upon the shaft 27 in a chuck-head 55 slidably mounted on the shaft and having an upright support 56 and a base 57 slidable on slide-ways 58 provided upon the support 20. A longitudinal feed-screw 59 is engaged in a threaded nut passage in the upright chuck-support 56, one end of said shaft being the shaft end 36 above referred to, the other end 60 being journaled in the uprights 23 and 24 of the head stock. As shown in Figure 8, the chuck-head is provided with a series of prongs 61 adapted to be forced into the material to grip it by means of a ring member 62 having cam portions 63 adapted upon rotation in one or the other direction to project and retract the prongs.

The cutting-off mechanism (hereinafter more fully referred to) is disposed just beyond the end of the shaft 27 in line with the reduced end 31 of the tail-stock shaft 32, the stock being intermittently fed over the end of the shaft 27 by step-by-step movement of the chuck, imparted thereto through intermittent rotation of the screw 59. After each feeding movement of the stock, the cutting mechanism cuts off a ring at its end, the shaft 32 being then automatically retracted by mechanism hereinafter to be described, to permit the cut-off ring to drop off.

Figure 6:
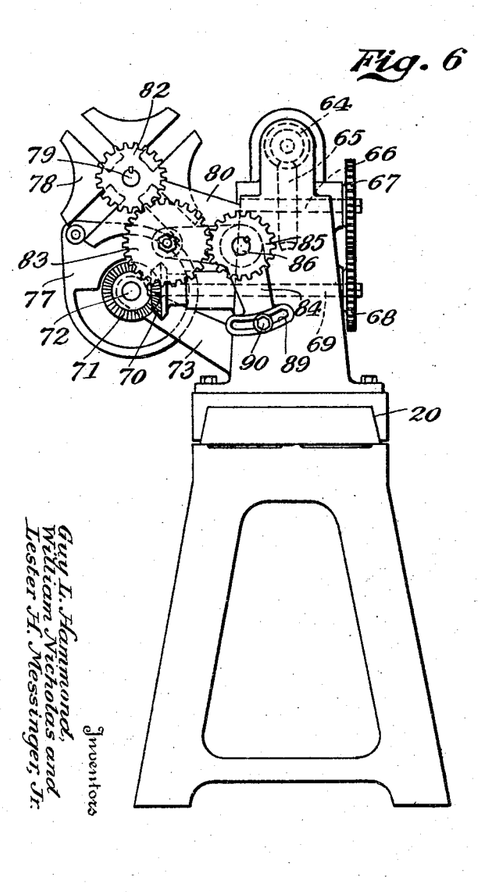
Figure 6 is an end elevation of the machine from the head stock end.
Figure 7:
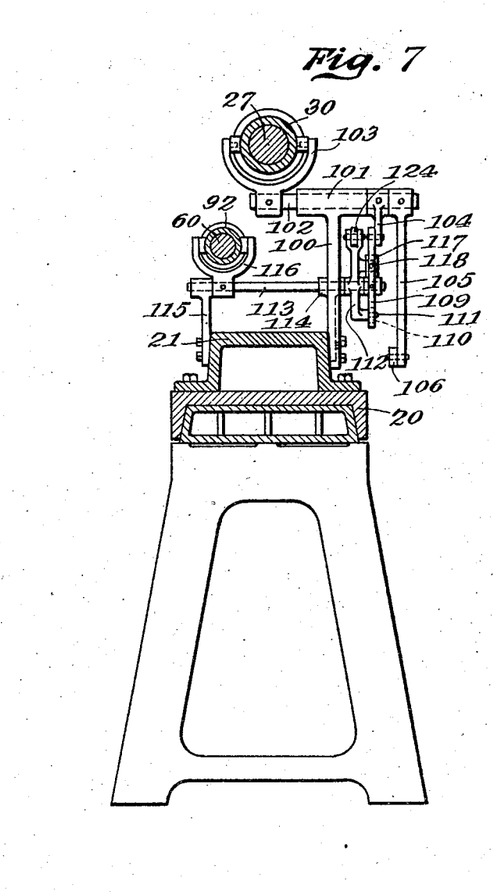
Figure 7 is a detailed vertical sectional view taken along the line 7—7 of Figure 1, and showing the clutch operating mechanism.

The stock-supporting shaft 27, when connected by the clutch 30 with the pulley 28, constitutes the main driving shaft of the machine, which, through gearing, drives the several cooperating parts. To this end, the shaft 27 is provided, at its end within the hollow upright 23 of the head-stock, with a worm 64 engaged with a worm gear 65 (Fig. 6) mounted upon a transversely-disposed shaft 66, provided at its forward end with a gear 67 meshing with a gear 68 mounted upon the forward end of a transverse shaft 69, and provided at its rearward end with a beveled gear 70 in mesh with a similar gear 71 upon the end of a longitudinal cam-shaft 72. The gears 67 and 68 are change-gears and may be replaced by different diameter gears to change the speed ratio between the drive-shaft and the cutter-knife operating cam-shaft. The cam-shaft extends the full length of the machine at its rearward side, and is journaled in end bearings 73 and 74 and intermediate bearings 75 and 76 suitably spaced to support it against vibration.

Adjacent the bearing 73 there is provided on the cam shaft 72 the crank element 77 of a Geneva movement, the slotted star element 78 being secured upon a short shaft 79 disposed above the shaft 72 and journaled in bearings 80 and 81 provided on the head-stock upright 23. A gear 82 is keyed upon the end of the shaft 79 which meshes with an intermediate gear 83 journaled on one end of an adjustment lever 84, and which meshes with a gear 85 keyed upon the end of an intermittent drive-shaft 86 journaled in suitable bearings 87 and 88 of the head stock. The lever 84 is provided, at its other end, with an arcuate slot 89 engaged by a securing-bolt 90 which permits adjustment of the axis of the gear 83, so that different diameter gears 82, 83 and 85 may be provided to change the ratio between the shaft 79 and the intermittent drive-shaft 86, and whereby there is a greater or less feed of the stock, the shaft 86 adapted, as will presently more fully appear, to drive the chuck feed-screw 59. The shaft 86 is in axial alignment with the shaft-end 60 of the feed-screw 59 and has secured thereon a square-toothed clutch member 91 adapted to be lockingly engaged by a square-toothed annularly-channeled clutch member 92 slidably keyed upon the shaft-end 60 and adaped to impart the intermittent rotation of the shaft 86 to the feed-screw. The clutch member 92 is further provided at its opposite end with ratchet teeth 93 disposed in opposed relation to the ratchet teeth 94 of a gear 95 loosely mounted upon the shaft-end 60, this gear meshing with a gear 96 provided on one end of a shaft 97 journaled in the uprights 23 and 24 of the head-stock, and provided at its other end with a gear 98 meshing with a gear 99 secured upon the end of the pulley 28. During the normal forward feed operation of the machine, the gear 95 is loosely driven upon the shaft-end 60. At the end of the forward feed, means, presently to be described, are operated to disengage the clutch 30 from the pulley 28, thereby stopping rotation of the main drive shaft 27, and the intermittent feed-screw shaft 86 and cam-shaft 72 driven thereby; and at the same time, the clutch 92 is disengaged from the clutch 91, thereby stopping the machine. By a further shifting movement imparted to the clutch 92, the teeth 93 are engaged with the teeth 94 of the continuously-driven reverse gear 95, and the screw shaft is thereby reversely rotated to return the chuck-carrier 55 to its starting position, the clutch being automatically shifted to neutral position upon completion of the return feed.

A support 100 is secured at the forward side of the head-stock base 21, and is provided at its upper end with a bearing 101 in which a rock-shaft 102 is rotatably supported, and has secured upon its inner end a forked yoke 103 engaged with the annular channel of the main drive-shaft clutch 30. Upon the outer end there are secured a short arm 104 and a relatively long arm 105, the latter being connected at its lower end by a relatively long rod 106 to a starting-and-stopping hand lever 107 mounted at 108 upon the support 20. The short arm 104 is pivotally connected to a link 109 provided at its lower end with a slot 110 engaged by a pin 111 at one end of a lever-arm 112 mounted upon a rock shaft 113 journaled in bearing-supports 114 and 115 secured at the front and rear of the base 21 of the head-stock. A forked yoke 116 is secured upon this shaft adjacent the bearing 115, and is engaged with the annular channel of the clutch 92. An upwardly projecting arm 117 is secured upon the forward end of the shaft 113, and is engaged at each side by adjustable set-screws 118 and 119 mounted upon an upwardly projecting central arm 120 of the lever 112 and which serve to adjustably connect said lever to the shaft 113 to thereby permit relative adjustment between the clutch 92 and said arm. At the end of the lever 112, opposed to the pin 111, there is pivotally connected a toggle rod 121 having its end slidably engaged in a swivel bearing 122 mounted upon the head stock, a spring 123 being provided upon the rod between its pivotally connected end and the swivel block. The central arm 120 of the lever 112 is pivotally connected to one end of an elongated slide-rod 124 having bearing in a bearing portion 125 of the chuck-carrier 56 and in a bearing-support 126 secured upon the end of the slide-way 58, a hand-lever 127 being secured upon the end of the rod adjacent the bearing-support 126. Adjustably secured stops 128 and 129 are provided on the rod 124 at each side of the chuck-carrier and in proximity to the ends of the forward and reverse feeds.

Figure 13:
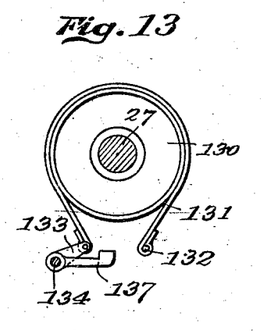
Figure 13 is a detailed view of the brake mechanism employed.

In order to immediately stop rotation of the shaft 27 upon disconnection of the clutch 30, a brake-drum 130 (Fig. 13) is secured upon said shaft and is engaged by a brake-band 131 secured at one end to a fixture 132, and at its other end to a rock-lever 133 provided upon a rock-shaft 134 journaled at its ends in bearings 135 and 136. A lever 137 is also adjustably secured upon the shaft in relation to the stop 129 of the rod 124, and is adapted to be engaged by a shoe 138 provided on the chuck-carriage as the latter reaches the end of its forward feed, to depress the lever 137 and thereby tighten the brake-band about the drum.

Figure 1:
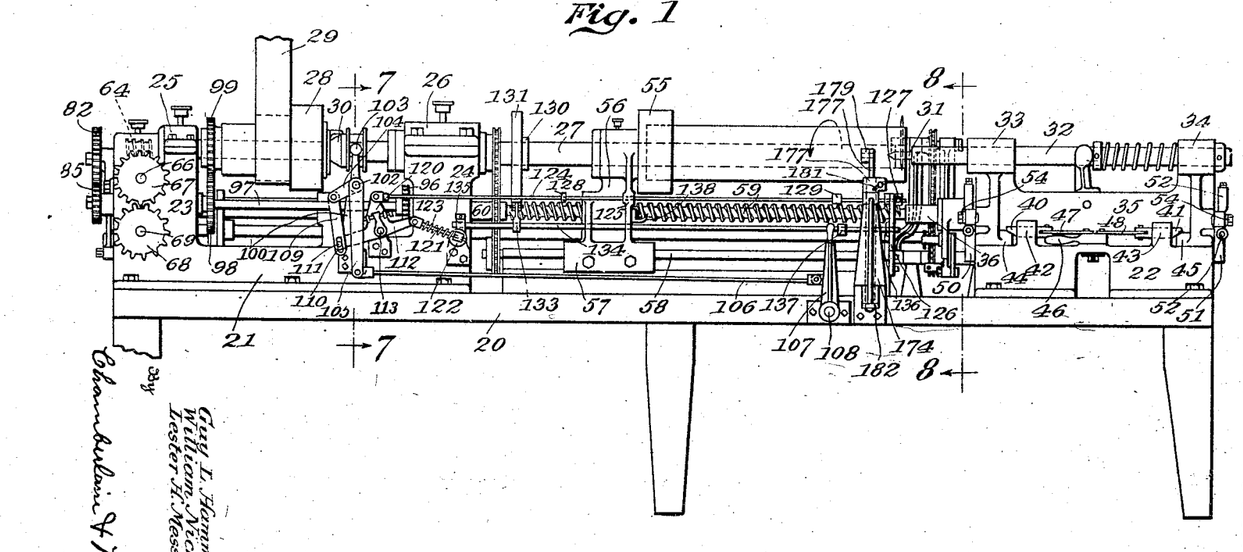
Figure 1 is a front elevation of a ring-cutting machine according to one embodiment of the invention.
Figure 4:
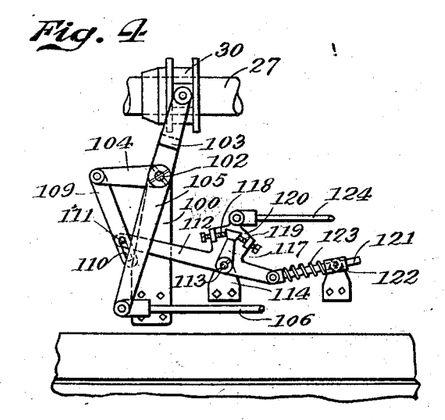
Figure 4 is an enlarged detailed view of clutch operating mechanism employed, and showing the same in the position for effecting reverse movement of the stock-carrying chuck.

The operation of the clutch operating and stopping mechanism is as follows:

As shown in Figure 1, the clutch operating mechanism is in its normal forward feed position, the clutch 30 being engaged with the pulley 28, and the clutch 92 being engaged with the clutch 91. As the carriage reaches the end of its forward feed, the same engages the stop 129 of the rod 124 and moves the latter to the right, the initial movement swinging the lever 112 and rotating the shaft 113 to gradually disengage the clutch 92 from the clutch 91, the pin 111 riding free in the slot 110 during this movement. As the clutch 92 becomes disengaged from the clutch 91, the pin 111 engages the end of the slot 110 and presses the link 109 upwardly, at the same time rotating the shaft 102, and through the yoke member 103 disengages the clutch 30 from the pulley 28, the machine being now in neutral position so that rotation of the main drive-shaft is stopped. At this point, the lever 112 has not quite reached the central position at which the toggle rod 121 functions. Simultaneously with this clutch-disengaging operation, the shoe 138 engages the lever 137 of the rod 134, rotating the same downwardly and applying the brake-band 131 to the brake-drum 130, thereby immediately stopping rotation of the shaft 27. In order to effect return movement of the chuck-carrier, the hand-lever 127, at the end of the rod 128, is pulled to the right, which action swings the lever 112 past its center point, and the toggle rod now swings it to the reverse position indicated in Figure 4. In this position, a further disengaging movement is imparted to the clutch 30, and the clutch 92 is shifted from its neutral position to engage the ratchet teeth 93 with the ratchet teeth 94 of the reverse gear 95. This gear is continuously rotated from the pulley 28; and as the clutch is engaged therewith, imparts continuous reverse rotation to the feed-screw 59, causing the carriage to be returned to its starting position. As it reaches its starting position, the bearing portion 125 engages the stop 128 of the rod 124, moving said rod to the left, and swinging the lever 112 into the position indicated in Figure 1, this movement causing the ratchet teeth of the clutch 92 to be disengaged from the ratchet teeth 94 of the reverse gear 95 and moving the square teeth of said clutch into engaging relation with the square-toothed clutch 91. This operation does not, however, affect the clutch 30, the pin 111 moving downwardly in the slot 110 without imparting movement to the link 109.

In order to again start the machine, the hand-lever 107 is pulled to the right which, through the pull-rod 106, swings the lever 105 and engages the clutch 30 with the pulley 28, thereby starting the machine. Obviously, the engagement of the square-toothed clutch 92 with the clutch 91, upon stopping of the reverse feed, is not positive, but these teeth will swing into mesh as soon as the shaft 86 starts to rotate, the clutch 92 being yieldably pressed against the clutch 91 by the spring 123 of the toggle rod 121.

Figure 2:
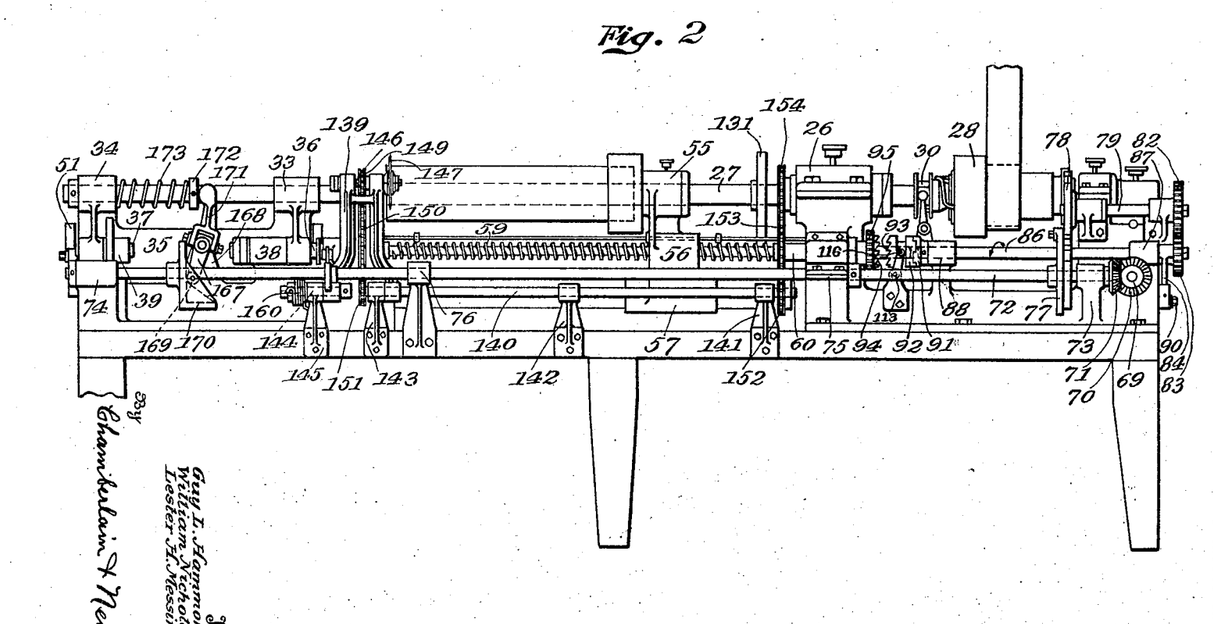
Figure 2 is a rear elevation thereof.

The ring-cutting mechanism (Figs. 2, 3, and 8) comprises a forked lever 139 pivotally supported at its base, one arm being loosely supported upon a counter-drive shaft 140 journaled in a series of bearing brackets 141, 142, and 143 secured at the rear of the support 20, while the other arm has a short shaft 144 secured thereto and journaled in a bearing bracket 145. At the upper end of the lever, there is journaled a knife-shaft 146 carrying the rotary cutter-knife 147 at one end. A guard and sharpening mechanism 148 may be mounted upon the upper end of the lever, if desired, and as shown in Figure 8. The shaft 146 is provided, between the two arms of the lever 139, with a sprocket gear 149 connected by a sprocket-chain 150 with a sprocket gear 151 secured upon one end of the shaft 140, the other end of said shaft having a sprocket gear 152 secured thereon and connected by a sprocket-chain 153 with a sprocket gear 154 secured upon the shaft 27. Thus, rotation of the shaft 27 imparts rotation to the knife.

The knife is adapted to be rocked inwardly and outwardly between the intermittent feeding movements of the stock, and, for this purpose, a lever-arm 155 is secured upon the shaft 144 and is adjustably connected to a lever-arm 156 loose on said shaft by means of a bolt 157 engaging the slot 158 of said lever-arm 156, a set-screw 159 disposed in said slot bearing upon the bolt 157. A coil spring 160 on the shaft 144, having one end secured to the shaft and the other end to the bracket 145, tends to rotate the support 139 and the lever 155 in clockwise direction, the bolt 157 pressing upwardly upon the lever 156.

The lever 156 is pivotally connected at its end to one end of a link 161, the other end of said link being adjustably secured at 162 in an arcuate slot 163 provided in one arm of a rock-lever 164 pivotally mounted on the shaft-end 36, and provided at its end with a roller 165 riding on a cam 166 secured upon the cam-shaft 72 and yieldably held in contact with said cam by the spring 160. The initial position of the knife may be adjusted by means of a set-screw 158, while the inward throw may be adjusted by changing the point of connection of the link 161 in the slot 163 of the lever 164, the greatest movement being imparted in the position indicated in Figure 8, with the connection at the outer end of the slot, while the smallest movement is imparted by connecting the same at the inner end of the slot.

Obviously, as the knife is moved inwardly in relation with the rapidly rotating stock projecting over the end of the shaft 27, a ring is cut off, the knife passing entirely through the inner periphery of the material, without touching the shaft.

Figure 5:
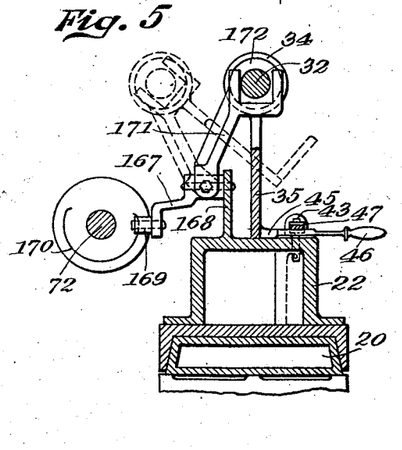
Figure 5 is a detailed sectional view taken along the line 5—5 of Figure 3, and showing the tail stock shaft reciprocating mechanism.

As the ring is cut off, it is adapted to be dropped off the tail-stock shaft 32; and to this end, the latter is adapted to be retracted after each ring-cutting operation. For this purpose, a lever 167 is pivotally mounted on a bracket portion 168 of the base 22, and is provided, at its end, with a roller 169 riding on a cam 170 carried upon the cam-shaft 72. A forked arm 171 is pivoted upon the lever 167 at right angles to the pivotal axis of said lever and in axial alignment with the shafts 36 and 37, and is engaged with a collar 172 secured upon the shaft 32, and between which collar and the bearing 34 there is provided a coil spring 173, normally pressing the shaft forwardly and pressing the lever 167 into contact with the cam 170. As shown in dotted lines, Figure 5, the arm 171 is adapted to move with the frame 35 as the latter is swung to permit placing of the stock on the shaft 27.

In order to back up the material in opposition to the cutting-knife, and to prevent vibration of the shaft 27, there is provided a steady-rest (Figs. 1, 3, and 8) comprising a bracket 174 secured upon the rearward side of the support 20 in which there is rotatably supported a vertical shaft 175 provided at its upper end with a support 176 having arms 177 and 178 adjustably supported thereon, and adapted to have their rollered ends 179 and 180 adjusted with relation to the surface of the stock by means of a screw 181. Upon the lower end of the shaft there is provided a stop 182 adapted to permit rotation of the shaft in clockwise direction but preventing its rotation in the opposite direction, and upon the intermediate portion of the shaft there is secured an arm 183 having its rolled end 184 disposed in the path of the base 57 of the chuck-carrier, a spring 185 coiled about the shaft, having its ends bearing upon the bracket 174 and said arm, adapted to yieldably retain the steady-rest in its normal position with the stop 182 abutting the base of the bracket. In order to automatically remove the steady-rest from the path of the chuck 55, as the latter approaches the end of the shaft 27, the base 57 engages the rolled end of the arm 183 and thereby gradually swings the rest free of the chuck, the rest resuming its normal position as the chuck is returned to its starting point.

Figure 10:
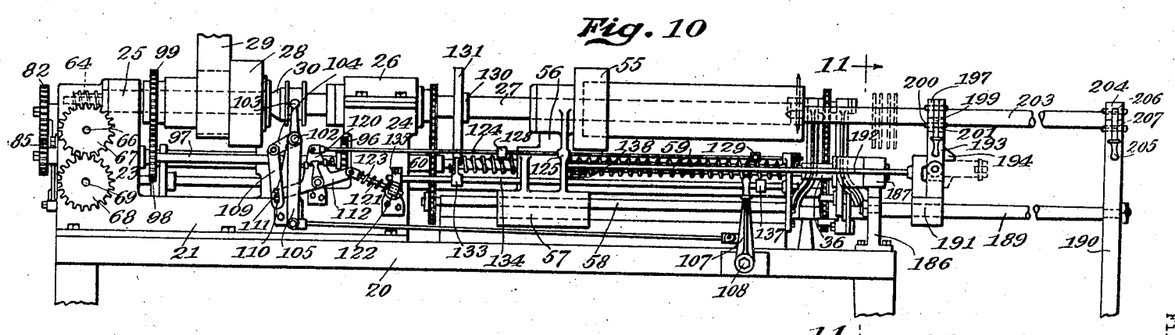
Figure 10 is a side elevation of a modified form of the invention.
Figure 11:
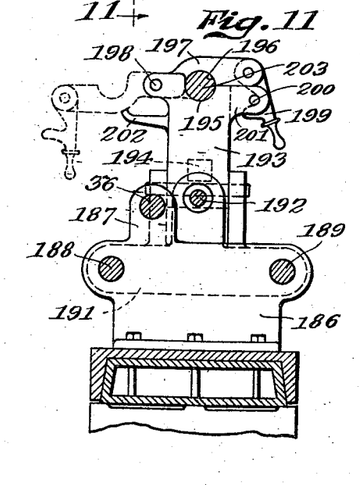
Figure 11 is a sectional view thereof taken along the line 11—11 of Figure 10.
Figure 12:
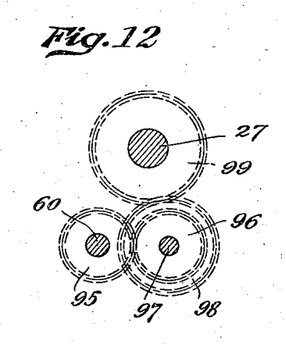
Figure 12 is a diagrammatic detailed view of the reverse gearing employed.

In Figures 10 and 11, there is illustrated a modification in which the cut-off rings are adapted to be collected upon the tail-stock shaft adapted to be removed at the completion of the cutting of the length of stock with the cut rings assembled thereon.

At the end of the support 20, there is secured a bracket 186 provided with an upwardly-projecting bearing portion 187 in which the shaft-end 36 of the feed-screw 59 is journaled, said bracket being connected by spaced parallel guide-bars 188 and 189 to a standard 190 suitably supported in spaced relation to the end of the support 20. A slide member 191 is supported on the guide-bars 188 and 189 and is connected to the chuck-carriage 56 by a rod 192, so that said member has movement with the chuck-carriage. A bearing standard 193 is hingedly supported upon the slide member, being adapted to be swung to a horizontal position, as shown in dotted lines, Figure 10, with a stop 194 thereon abutting the face of the slide member. It is provided, in its upper surface, with a semi-cylindrical bearing recess 195 which cooperates with a semi-cylindrical bearing recess 196 of a top bearing member 197 hinged to the standard at 198, and adapted to be held in place by a wedge clamp 199 engaged with a pin 200 provided between lugs 201 on the standard. A rest 202 is provided on the standard 193 to support the top bearing in its open position, as shown in dotted lines, Figure 11.

The tail-stock shaft 203 is loosely disposed in the bearing recesses 195 and 196, which are of slightly enlarged diameter to permit sliding movement of the slide member; and, at its outer end, is tightly gripped in a substantially similar bearing provided at the top of the standard 190 and comprising a hinged top bearing member 204 and a clamp 205 respectively provided with semi-cylindrical bearing recesses 206 and 207, which upon fastening of the clamp tightly grip the shaft to hold it against end movement.

In operation, the cut-off rings collect upon the tail-stock shaft, the slide member 191 moving with each movement of the chuck-carrier, so that a constant distance is maintained between the points of support of the shafts 27 and 203, and thus any chance of variation in the cutting operation, due to changing this distance, is obviated. At the completion of the cutting of a length of stock, clamps 199 and 205 are released, and the shaft 203 with the rings carried thereon is removed. A new piece of stock is then placed upon the shaft 203 and the same is placed in the machine again, the standard 193 being swung downwardly out of the way of the stock, as shown in dotted lines, and the top bearing member 204 clamped in place, the stock being thereupon slid on to the shaft 27 and secured at its end in the chuck 55. The standard 193 is then engaged with the shaft, and the top bearing member 197 is clamped in place, when the machine is again ready for operation.

We have illustrated and described a preferred and satisfactory embodiment of the invention, but it will be obvious that changes may be made therein within the spirit and scope thereof as defined in the appended claims.

Having thus described our invention, what we claim and desire to secure by Letters Patent is:

1. In a machine of the character described, a rotary tube-supporting shaft including a supporting surface, a rotary cutter-knife so constructed and arranged as to be moved into cutting relation with a tube on said shaft at a point outwardly removed from the end of said supporting surface, a cam shaft including cam means imparting oscillatory movement to said cutter-knife, adjustment means for varying the extent of movement of said cutter-knife and its relation to said cam, and work feeding means for feeding said tube to be cut.

2. In a machine of the character described, a rotary tube-supporting shaft including a supporting surface, a rotary cutter-knife so constructed and arranged as to be moved into cutting relation with a tube on said shaft at a point outwardly removed from the end of said supporting surface, a cam shaft driven from said tube-supporting shaft including cam means imparting movement to said cutter-knife, means for changing the relative speed between said tube-supporting shaft and said cam shaft whereby the relative speed of said cam-shaft may be varied, and work feeding means for feeding said tube to be cut.

3. In a machine of the character described, a rotary tube-supporting shaft including a supporting surface, a rotary cutter-knife so constructed and arranged as to be moved into cutting relation with a tube on said shaft at a point outwardly removed from the end of said supporting surface, a counter-shaft driven by said tube-supporting shaft and imparting rotary movement to said cutter-knife, means for changing the relative speed between said tube-supporting shaft and said counter-shaft whereby the relative speed of said counter-shaft may be varied, and work feeding means for feeding said tube to be cut.

4. In a machine of the character described, a rotary tube-supporting shaft including a supporting surface, a rotary cutter-knife so constructed and arranged as to be moved into cutting relation with a tube on said shaft at a point outwardly removed from the end of said supporting surface, a work-carrying chuck slidable on said shaft for gripping the tube at one end and moving its other end over the end of said supporting surface, a rotary feed-screw disposed longitudinally of said shaft and connected to said chuck, and intermittent drive means between said tube-supporting shaft and said feed-screw whereby said feed-screw is intermittently rotated to impart step-by-step movement to said chuck.

5. In a machine of the character described, a rotary tube-supporting shaft including a supporting surface, a rotary cutter-knife so constructed and arranged as to be moved into cutting relation with a tube on said shaft at a point outwardly removed from the end of said supporting surface, a work-carrying chuck slidable on said shaft for gripping the tube at one end and moving its other end over the end of said supporting surface, a rotary feed-screw disposed longitudinally of said shaft and connected to said chuck, intermittent drive means between said tube-supporting shaft and said feed-screw whereby said feed-screw is intermittently rotated to impart step-by-step movement to said chuck, and a clutch adapted to connect and disconnect said intermittent drive means relatively to said tube-supporting shaft.

6. In a machine of the character described, a rotary tube-supporting shaft including a supporting surface, a rotary cutter-knife so constructed and arranged as to be moved into cutting relation with a tube on said shaft at a point outwardly removed from the end of said supporting surface, a work-carrying chuck slidable on said shaft for gripping the tube at one end and moving its other end over the end of said supporting surface, a rotary feed-screw disposed longitudinally of said shaft and connected to said chuck, intermittent drive means between said tube-supporting shaft and said feed-screw whereby said feed-screw is intermittently rotated to impart step-by-step movement to said chuck, and means for changing the relative speed between said tube-supporting shaft and said intermittent drive means.

7. In a machine of the character described, a rotary tube-supporting shaft, drive means for said shaft, a cutter-knife, a tube-carrier slidable on said shaft, means driven by said drive means for feeding said carrier longitudinally of the shaft, and means adapted to be operated at the end of the forward feed of said carrier to disconnect said drive means.

8. In a machine of the character described, a rotary tube-supporting shaft, drive means for said shaft, a cutter-knife, a tube-carrier slidable on said shaft, means driven by said drive means for feeding said carrier longitudinally of the shaft, means so constructed and arranged as to be operated at the end of the forward feed of said carrier to disconnect said drive means, and reverse drive means adapted to impart return movement to said carrier.

9. In a machine of the character described, a rotary tube-supporting shaft, drive means for said shaft, a cutter-knife, a tube-carrier slidable on said shaft, means driven by said drive means for feeding said carrier longitudinally of the shaft, means so constructed and arranged as to be operated at the end of the forward feed of said carrier to disconnect said drive means, reverse drive means for imparting return movement to said carrier, and stop means so constructed and arranged as to be operated at the end of the reverse feed of said carrier to disconnect said reverse drive means.

10. In a machine of the character described, a rotary tube-supporting shaft, drive means for said shaft, a cutter-knife, a tube-carrier slidable on said shaft, forward feed means driven by said drive means for intermittently feeding said carrier longitudinally of the shaft, means so constructed and arranged as to be operated at the end of the forward feed of said carrier to disconnect said drive means, and reverse drive means for imparting continuous return movement to said carrier.

11. In a machine of the character described, a rotary tube-supporting shaft, drive means for said shaft, a cutter-knife, a tube-carrier slidable on said shaft, means driven by said drive means for feeding said carrier longitudinally of the shaft, means so constructed and arranged as to be operated at the end of the forward feed of said carrier to disconnect said drive means, and manually operable means for connecting said drive means.

12. In a machine of the character described, a rotary tube-supporting shaft, drive means for said shaft, a cutter-knife, a tube carrier slidable on said shaft, means driven by said drive means for feeding said carrier longitudinally of the shaft, means so constructed and arranged as to be operated at the end of the forward feed of said carrier to disconnect said drive means, reverse drive means for imparting return movement to said carrier, manually operable means for connecting said reverse drive means, means so constructed and arranged as to be operated at the end of the reverse feed of said carrier to disconnect said reverse drive means, and manually operable means so constructed and arranged as to be operated to connect said forward drive means.

13. In a machine of the character described, a rotary tube-supporting shaft, drive means for said shaft, a cutter-knife, a tube-carrier slidable on said shaft, means driven by said drive means for feeding said carrier longitudinally of the shaft, means so constructed and arranged as to be operated at the end of the forward feed of said carrier to disconnect said drive means, and brake means on said tube-supporting shaft so constructed and arranged as to be operated at the end of the forward feed of said carrier.

14. In a machine of the character described, a rotary tube-supporting shaft, continuous drive means for said shaft, a clutch between said shaft and said drive means, a cutter-knife, a tube-carrier slidable on said shaft, intermittent forward drive means for said carrier, clutch means between said intermittent drive means and said shaft, and clutch-shifting means so constructed and arranged as to simultaneously disengage said first and last mentioned clutch means.

15. In a machine of the character described, a rotary tube-supporting shaft, continuous drive means for said shaft, a clutch between said shaft and said drive means, a cutter-knife, a tube-carrier slidable on said shaft, intermittent forward drive means for said carrier, clutch means between said intermittent drive means and said shaft, clutch-shifting means so constructed and arranged as to simultaneously disengage said first and last mentioned clutch means, and continuous reverse drive means for said carrier so constructed and arranged as to be connected by said last-mentioned clutch means.

16. In a machine of the character described, a rotary tube-supporting shaft, continuous drive means for said shaft, a clutch between said shaft and said drive means, a cutter-knife, a tube-carrier slidable on said shaft, intermittent forward drive means for said carrier, clutch means between said intermittent drive means and said shaft, clutch-shifting means so constructed and arranged as to simultaneously disengage said first and last mentioned clutch means, continuous reverse drive means for said carrier so constructed and arranged as to be connected by said last-mentioned clutch means, means so constructed and arranged as to be operated at the end of the forward feed of said carrier to automatically move said first and last mentioned clutch means to neutral position, and manually operable means for connecting said reverse drive means.

17. In a machine of the character described, a rotary tube-supporting shaft, continuous drive means for said shaft, a clutch between said shaft and said drive means, a cutter-knife, a tube-carrier slidable on said shaft, intermittent forward drive means for said carrier, clutch means between said intermittent drive means and said shaft, clutch-shifting means so constructed and arranged as to simultaneously disengage said first and last mentioned clutch means, continuous reverse drive means for said carrier so constructed and arranged as to be connected by said last-mentioned clutch means, means so constructed and arranged as to be operated at the end of the reverse feed of said carrier to automatically disconnect said reverse drive means, and manually operable means for connecting said first and last mentioned clutch means.

18. In a machine of the character described, a rotary tube-supporting shaft including a supporting surface, a cutter-knife so constructed and arranged as to be moved into cutting relation with work on said shaft at a point outwardly removed from the end of said supporting surface, tube feeding means for feeding a tube to be cut, a movable steady-rest so constructed and arranged as to engage the tube on said shaft in substantially opposed relation to the cutter-knife, and means for swinging said steady-rest out of the path of said carrier as the latter approaches the end of its forward feed.

19. In a machine of the character described, a rotary tube-supporting shaft, drive means for said shaft, a cutter-knife so constructed and arranged as to be intermittently engaged with a tube on said shaft, a tube carrier slidable on said shaft, and means at one end of said shaft so constructed and arranged as to support the tube coaxially therewith and whereby it may be slid from said means on to said shaft.

20. In a machine of the character described, a rotary tube-supporting shaft, drive means for said shaft, a cutter-knife so constructed and arranged as to be intermittently engaged with a tube on said shaft, a tube-carrier slidable on said shaft, a tail stock shaft normally coaxial with said shaft and removable transversely from coaxial engagement therewith, and tube guides for supporting a tube in coaxial relation with said tube-supporting shaft upon removal of said tail stock shaft from coaxial relation and whereby said tube may be slid on to said tube-supporting shaft.

21. In a machine of the character described, a rotary tube-supporting shaft, drive means for said shaft, a cutter-knife so constructed and arranged as to be intermittently engaged with a tube on said shaft, a tube-carrier slidable on said shaft, a tail stock shaft engaging the tube-supporting shaft at one end, a support supporting said tail stock shaft at its other end, a sliding support for said tail stock shaft engaging it between said fixed support and said tube-supporting shaft, and means whereby a constant distance is maintained between them.

22. In a machine of the character described, a rotary tube-supporting shaft, drive means for said shaft, a cutter-knife so constructed and arranged as to be intermittently engaged with a tube on said shaft, a tube-carrier slidable on said shaft, a tail stock shaft engaging the tube-supporting shaft at one end, a fixed support supporting said tail stock shaft at its other end, a sliding support for said tail stock shaft engaging it between said fixed support and said tube-supporting shaft, and means connecting said work-carrier to said sliding support whereby a constant distance is maintained between them.

Signed at Bridgeport, in the county of Fairfield and State of Connecticut, this 29th day of March, A. D. 1927.

GUY L. HAMMOND.
WILLIAM NICHOLAS.
LESTER H. MESSINGER, Jr.